(12) United States Patent
Peng et al.

(10) Patent No.: US 12,264,096 B2
(45) Date of Patent: Apr. 1, 2025

(54) LIFT-UP ROLLER ARRANGEMENT FOR ELECTRONIC FLOAT GLASS

(71) Applicants: BENGBU CHINA OPTOELECTRONIC TECHNOLOGY CO., LTD, Bengbu (CN); CNBM RESEARCH INSTITUTE FOR ADVANCED GLASS MATERIALS GROUP CO., LTD, Bengbu (CN); CHINA NATIONAL BUILDING MATERIAL GROUP CO., LTD., Beijing (CN)

(72) Inventors: Shou Peng, Bengbu (CN); Chong Zhang, Bengbu (CN); Zhiqiang Cao, Bengbu (CN); Jichen Sun, Bengbu (CN); Xingda Wu, Bengbu (CN); Weiguang Gao, Bengbu (CN)

(73) Assignees: BENGBU CHINA OPTOELECTRONIC TECHNOLOGY CO., LTD, Bengbu (CN); CNBM RESEARCH INSTITUTE FOR ADVANCED GLASS MATERIALS GROUP CO., LTD, Bengbu (CN); CHINA NATIONAL BUILDING MATERIAL GROUP CO., LTD, Beijing (CN)

( * ) Notice: Subject to any disclaimer, the term of this patent is extended or adjusted under 35 U.S.C. 154(b) by 0 days.

(21) Appl. No.: 18/255,225

(22) PCT Filed: May 17, 2023

(86) PCT No.: PCT/CN2023/094683
§ 371 (c)(1),
(2) Date: May 31, 2023

(87) PCT Pub. No.: WO2024/139016
PCT Pub. Date: Jul. 4, 2024

(65) Prior Publication Data
US 2024/0217859 A1    Jul. 4, 2024

(30) Foreign Application Priority Data
Dec. 30, 2022    (CN) .......................... 202211722710.6

(51) Int. Cl.
*C03B 35/18*     (2006.01)
*B65G 13/06*    (2006.01)
(Continued)

(52) U.S. Cl.
CPC .......... *C03B 35/181* (2013.01); *B65G 13/065* (2013.01); *C03B 35/168* (2013.01);
(Continued)

(58) Field of Classification Search
CPC ... C03B 35/181; C03B 35/168; C03B 35/185; C03B 35/188; B65G 13/065; B65G 45/16
(Continued)

(56) References Cited

U.S. PATENT DOCUMENTS 3,853,525 A * 12/1974 Gorman ................ C03B 35/181
                                                         65/374.13
4,216,005 A     8/1980 Gladieux et al.
(Continued)

FOREIGN PATENT DOCUMENTS

CN    1446765 A    10/2003
CN    102583993 A    7/2012
(Continued)

OTHER PUBLICATIONS

Yu Peixia et al., Large Float Glass Production Equipment and Its Construction, China Light Industry Press, May 31, 2010, p. 91, and its English abstract, 11 pages.

*Primary Examiner* — James R Bidwell
(74) *Attorney, Agent, or Firm* — Bret E. Field; Bozicevic, Field & Francis LLP

(57) ABSTRACT

A lift-up roller arrangement for electronic float glass, including a plurality of lift-up rollers rotatably arranged on the inner wall of an annealing kiln, wherein a plurality of boron nitride rings are fixedly sleeved on the outer side wall of each lift-up roller; a heat-resisting steel tubes is arranged on each of both sides of each lift-up roller; a plurality of exhaust holes are arranged on an outer side wall of the heat-resisting steel tube; the heat-resisting steel tube is in communication with an external hot gas supply case; and a plurality of cleaning assemblies used in cooperation with the lift-up rollers are arranged at the inner bottom of the annealing kiln.

8 Claims, 4 Drawing Sheets

(51) Int. Cl.
  *B65G 45/16* (2006.01)
  *C03B 35/16* (2006.01)
(52) U.S. Cl.
  CPC .......... *C03B 35/185* (2013.01); *C03B 35/188* (2013.01); *B65G 45/16* (2013.01)

(58) Field of Classification Search
  USPC .................................................. 198/499, 782
  See application file for complete search history.

(56) References Cited

U.S. PATENT DOCUMENTS

| | | | |
|---|---|---|---|
| 4,773,925 A | * | 9/1988 | Schultz ................. C03B 35/187 65/273 |
| 6,357,262 B1 | | 3/2002 | Friedel et al. |
| 8,002,687 B2 | * | 8/2011 | Heighway ............. C03B 35/181 492/41 |

FOREIGN PATENT DOCUMENTS

| | | | | |
|---|---|---|---|---|
| CN | 203972470 U | | 12/2014 | |
| CN | 206337173 U | | 7/2017 | |
| CN | 206502745 U | | 9/2017 | |
| CN | 109422444 A | * | 3/2019 | ............. C03B 18/02 |
| CN | 209797777 U | | 12/2019 | |
| CN | 112119044 A | * | 12/2020 | ............. C03B 18/02 |
| DE | 19544995 C1 | * | 4/1997 | ........... C03B 35/165 |
| DE | 102017208710 A1 | * | 3/2018 | ........... B21B 39/008 |
| KR | 20160006445 A | | 1/2016 | |
| KR | 20190025504 A | | 3/2019 | |
| KR | 20200136263 A | | 12/2020 | |

* cited by examiner

# LIFT-UP ROLLER ARRANGEMENT FOR ELECTRONIC FLOAT GLASS

CROSS-REFERENCE TO RELATED APPLICATIONS

The present application is a national phase under 35 U.S.C. § 371 of International Application No. PCT/CN2023/094683, filed May 17, 2023, which claims priority to Chinese Patent Application No. 202211722710.6, filed with China National Intellectual Property Administration on Dec. 30, 2022 and entitled "Lift-up roller Arrangement for Electronic Float Glass", which are incorporated herein by reference in their entirety.

The present application claims the priority to a Chinese Patent Application No. 202211722710.6, filed with China National Intellectual Property Administration on Dec. 30, 2022 and entitled "Lift-up roller Arrangement for Electronic Float Glass", which is incorporated herein by reference in its entirety.

TECHNICAL FIELD

The present application relates to glass production technology, and in particular to a lift-up roller arrangement for electronic float glass.

BACKGROUND

The process of forming float glass is as follows. Firstly, melted glass liquid at about 1100° C. enters a tin bath through a flow channel and a flow trough. Due to different densities of the glass liquid and tin liquid, the glass liquid floats on the tin liquid. Under the action of gravity and surface tension, the glass liquid begins to spread, polish, and uniformly cool down. Under the action of an edge pulling machine, a glass ribbon of a certain thickness is formed by thinning or accumulating. Then, the glass ribbon is gradually cooled down in the tin bath to form a glass plate. When the glass plate at a tin bath outlet is cooled to about 650° C., and is lifted by a lift-up roller and leaves the tin bath under the traction force of annealing kiln conveyor rollers, and enters the annealing kiln for annealing to relieve stress. The glass plate are inspected, cut, boxed and packed into storage.

Float glass production traction is mainly from the annealing kiln rollers, the annealing kiln rollers for float glass are generally steel rollers or ceramic rollers, and more advanced steel rollers with a zirconium plating material surface, but a friction will be produced between the glass ribbon from the tin bath and the annealing kiln conveyor rollers, in particular when three lift-up rollers in the lift-up rollers are contaminated with impurities such as tin oxide from the tin bath in different degrees in the long-term production, so that the surfaces of the lift-up rollers have many adhesive substances and form many irregular protrusions, resulting in scratches and flocculent glass defects of a lower surface of the glass ribbon in different degrees.

SUMMARY

Embodiments of the present application aim to provide a lift-up roller arrangement for electronic float glass to solve the above problems in the prior art.

In the present application, a lift-up roller arrangement for electronic float glass is provided, including a plurality of lift-up rollers rotatably arranged on an inner wall of an annealing kiln, wherein a plurality of boron nitride rings are fixedly sleeved on an outer side wall of each lift-up roller; a heat-resisting steel tube is arranged on each of both sides of each of the lift-up rollers; a plurality of exhaust holes are arranged on an outer side wall of the heat-resisting steel tube; the heat-resisting steel tube is in communication with an external hot gas supply case; and a plurality of cleaning assemblies used in cooperation with the lift-up rollers are arranged at an inner bottom of the annealing kiln.

In some embodiments of the present application, multiple pairs of first support frames are symmetrically fixed at the inner bottom of the annealing kiln; a lifting rod is arranged on an upper end surface of each first support frame; two bearing rings are fixedly sleeved on the outer side wall of each of the heat-resisting steel tubes in a symmetrical manner; and an upper end of the lifting rod is fixedly connected to an outer side wall of the bearing ring.

In some embodiments of the present application, each of the cleaning assemblies includes two second support frames symmetrically fixed at the inner bottom of the annealing kiln; one and the same mounting base is fixed at the upper end surfaces of the two second support frames; and a scraper is arranged in the mounting base.

In some embodiments of the present application, a lower through-slot, in which a down-pressing plate (12) is movably arranged, is arranged on a side wall of each of the mounting bases; the scraper is fixed to an upper end surface of the respective down-pressing plate, and movably passes through the mounting base.

In some embodiments of the present application, the heat-resisting steel tubes are arranged on left and right sides of each roller of the lift-up rollers, respectively; a spacing exists between the scraper and the outer side wall of the boron nitride ring, and the scraper is arranged on a left side of the boron nitride ring.

In some embodiments of the present application, a plurality of telescopic rods are fixed between each of the lower through-slots and the down-pressing plate; a plurality of springs are fixed between the lower through-slot and the down-pressing plate, and are movably sleeved on outer side walls of the telescopic rods.

In some embodiments of the present application, an inclined scraping block is fixed at the upper end surface of each of the mounting bases.

In some embodiments of the present application, the inclined scraping block is mounted against the scraper, and an inclined surface of the inclined scraping block is arranged on a side of the inclined scraping block facing the lift-up rollers.

In some embodiments of the present application, both sides of each of the down-pressing plates movably pass through the annealing kiln; a down-pressing through-slot used in cooperation with the down-pressing plate is arranged on each of both sides of the annealing kiln.

The present invention has the following beneficial effects.

1. After the float glass ribbon exits the tin bath outlet, light edges on both sides of the glass ribbon directly contact the outer side walls of the boron nitride rings. During the rotation of the respective boron nitride rings by the lift-up roller, the glass ribbon is conveyed. During this process, the hot gas supply case delivers hot nitrogen into each heat-resisting steel tube, and the hot nitrogen flows upward from the exhaust holes of the respective heat-resisting steel tube, applying a force on the lower surface of an effective plate width of the float glass ribbon to avoid a concave on a portion of the glass ribbon of the effective plate width. When conveying the float glass ribbon in this way, the friction between the lift-up roller and the lower surface of the effective plate width of the glass ribbon can be avoided, effectively solving the problem of under-plate scratches and flocculent defects of the electronic float glass ribbon. Furthermore, when using an air-floating effect of the nitrogen, the lift-up roller arrangement can be fully filled with the nitrogen to avoid air in the lift-up roller arrangement from entering the tin bath through the tin bath outlet, reducing the generation of impurities such as tin oxide in the tin bath.

2. In use, a spacing exists between the scraper and the outer side wall of the boron nitride ring, the scraper is arranged on the left side of the boron nitride ring. When the impurities adhering to the outer side wall of the boron nitride ring are in contact with the scraper during the rotation of the boron nitride ring, a force to the left is applied on the scraper, but the scraper remains stationary, so that the impurities adhering to the outer side wall of the boron nitride ring are scraped off, which is convenient to use.

BRIEF DESCRIPTION OF THE DRAWINGS

The drawings illustrated herein are used to provide a further understanding of the present application and form part of the present application. The schematic embodiments of the present application and the description thereof are used to explain the present application, and do not constitute an improper limitation on this application.

REFERENCE NUMBERS

1—Annealing kiln; 2—Lift-up roller; 3—Boron nitride ring; 31—Boron nitride rings on both sides; 4—Heat-resisting steel tube; 41—Exhaust hole; 5—First support frame; 6—Lifting rod; 7—Bearing ring; 8—Second support frame; 9—Mounting base; 91—Connector; 10—Scraper; 11—Lower through-slot; 12—Down-pressing plate; 121—Down-pressing plate horizontal portion; 122—Down-pressing plate vertical portion; 13a—Telescopic rod; 13b—Spring; 14—Inclined scraping block; 15—Down-pressing through-slot; 16—Guiding rod.

DETAILED DESCRIPTION

In order to make the objects, technical solutions and advantages more clearly, the present application will be further described in detail below with reference to the appended drawings and embodiments. Obviously, the embodiments described are only some of the embodiments of the present application instead of all of them. All other embodiments obtained by those ordinary skilled in the art based on the embodiments of the present application fall within the scope of the present application.

Figure 1:
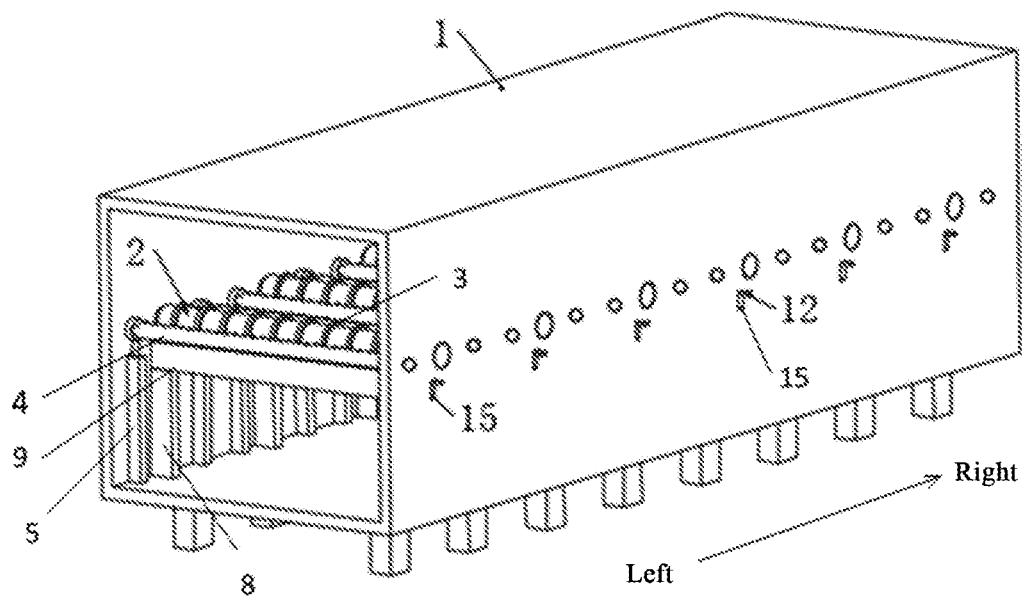
FIG. 1 is a schematic view illustrating an overall structure of a lift-up roller arrangement in an embodiment of the present application.
Figure 2:
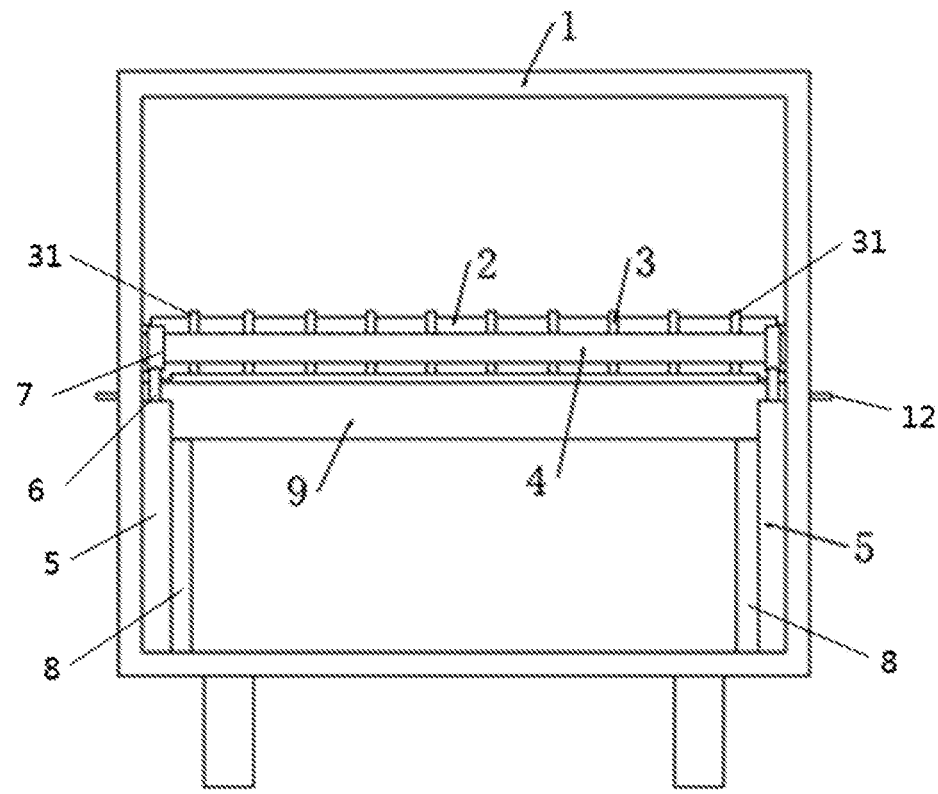
FIG. 2 is a side view of the lift-up roller arrangement in an embodiment of the present application.
Figure 3:
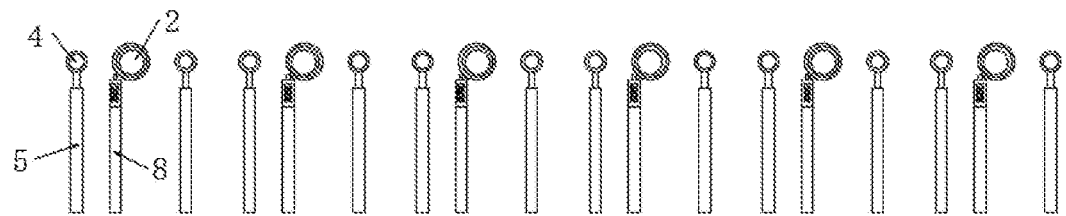
FIG. 3 is a view illustrating the distribution of lift-up rollers and heat-resisting steel tubes in an annealing kiln in an embodiment of the present application.

As shown in FIGS. 1-6, an embodiment of the present application proposes a lift-up roller arrangement for electronic float glass, including a plurality of lift-up rollers 2 rotatably arranged on the inner wall of an annealing kiln 1, wherein a plurality of boron nitride rings 3 are fixedly sleeved on the outer side wall of each lift-up roller 2; a heat-resisting steel tube 4 is arranged on each of two sides of each of the lift-up rollers 2; a plurality of exhaust holes are arranged on the outer side wall of the heat-resisting steel tube 4; the heat-resisting steel tube 4 is in communication with an external hot gas supply case; and a plurality of cleaning assemblies used in cooperation with the lift-up rollers 2 are arranged at the inner bottom of the annealing kiln 1. As shown in FIGS. 1 and 2, the heat-resisting steel tubes 4 are arranged on the left and right sides of each lift-up roller 2, respectively. In an actual device, the left side in FIG. 1 is usually the front side and the right side is the rear side. That is, the heat-resisting steel tubes 4 are arranged on the front and rear sides of each lift-up roller 2.

For example, there are six lift-up rollers 2, each with a diameter of 150 mm. Ten boron nitride rings 3 are sleeved on each lift-up roller 2, each with an inner diameter of 150 mm, an outer diameter of 170 mm, and a width of 40 mm. There are 12 heat-resisting steel tubes 4, each with a diameter of 40 mm and made of 2520 stainless steel. The spacing between the exhaust holes on the heat-resisting steel tube 4 is 25 mm, and the diameters of the exhaust holes are 0.3 mm. The distance between the heat-resisting steel tube 4 and a glass ribbon in the vertical direction is 15 mm, which means that the upper level of the heat-resisting steel tube 4 is lower than the upper level of the lift-up roller 2 by 5 mm. The adjustable distance of the heat-resisting steel tube 4 in the up and down direction is 20 mm, and the specific adjustable distance is determined based on the thickness of the ultra-thin electronic float glass produced and the nitrogen injection pressure. For the production of an ultra-thin electronic float glass below 1.1 mm, the distance between the heat-resisting steel tube 4 and the glass ribbon can be about 15 mm, and the nitrogen pressure in the heat-resisting steel tube 4 is about 0.05 Kpa.

Figure 4:
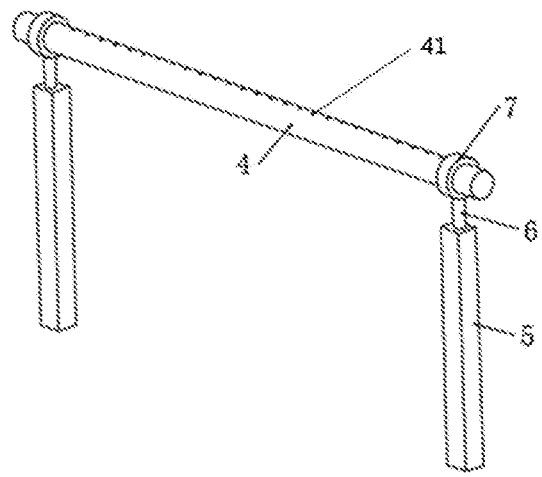
FIG. 4 is a schematic view illustrating the connection between the heat-resisting steel tube and a bearing ring in an embodiment of the present application.

In use, after exiting the tin bath outlet, the float glass ribbon enters the lift-up roller arrangement for electronic float glass. Light edges on both sides of the glass ribbon (not shown in the figures) then directly contact the outer side walls of the boron nitride rings 3. As shown in FIG. 2, the light edges on both sides of the glass ribbon (not shown in the figures) then directly contact the outer side walls of the boron nitride rings 31 on both sides of the lift-up roller 2. Meanwhile, the lower surface of the effective portion of the glass ribbon also contacts the upper surface of each boron nitride ring 3 on the lift-up roller 2. During the rotation of the respective boron nitride rings 3 by the lift-up roller 2, the glass ribbon is conveyed. During this process, the hot gas supply case delivers hot nitrogen into each heat-resisting steel tube 4, and the hot nitrogen flows upward from the exhaust holes of the respective heat-resisting steel tube 4, applying a force on the lower surface of an effective plate width of the float glass ribbon to avoid a concave on a portion of the glass ribbon of the effective plate width. As shown in FIG. 4, the exhaust holes 41 are located at the top of the heat-resisting steel tube 4, and the hot nitrogen flows from the exhaust holes 41 towards the float glass ribbon above. When conveying the float glass ribbon in this way, the friction between the lift-up roller 2 and the lower surface of the effective plate width of the glass ribbon can be avoided, effectively solving the problem of under-plate scratches and flocculent defects of the electronic float glass ribbon. Furthermore, when using an air-floating effect of the nitrogen, the lift-up roller arrangement can be fully filled with the nitrogen to avoid air in the lift-up roller arrangement from entering the tin bath through the tin bath outlet, reducing the generation of impurities such as tin oxide in the tin bath.

As shown in FIGS. 1 to 4, multiple pairs of first support frames 5 are symmetrically fixed at the inner bottom of the annealing kiln 1. As shown in FIGS. 2 and 4, a lifting rod 6 is arranged on the upper end surface of each of the first support frames 5, and two bearing rings 7 are fixedly sleeved on an outer side wall of each of the heat-resisting steel tubes 4 in a symmetrical manner, and the upper end of the lifting rod 6 is fixedly connected to the outer side wall of the bearing ring 7. As shown in FIG. 4, A pair of first support frames 5 arranged symmetrically are configured to arrange the heat-resisting steel tube 4 inside the annealing kiln 1 by the bearing ring 7 of the lifting rod 6 arranged on the upper end thereof.

The lifting height of the lifting rod 6 in FIG. 4 can be adjusted. Since this type of lifting structure is prior art, which will not be explained here. By arranging a liftable lifting rod 6, the height position of the heat-resisting steel tube 4 can thus be adjusted to cooperate with a glass ribbon with a different thickness.

In an embodiment of the present application, as shown in FIG. 1, FIG. 2 and FIG. 5a and FIG. 5b, each cleaning assembly includes two second support frames 8 symmetrically fixed at the inner bottom of the annealing kiln 1, one and the same mounting base 9 is fixed at the upper end surfaces of the two second support frames 8, and a scraper 10 is arranged in the mounting base 9.

As shown in FIG. 1, when the boron nitride ring 3 is in use, the glass ribbon moves from left to right, which can also be said to move from front to back in an actual production. The outer side wall of the boron nitride ring will inevitably be adhered with some impurities. In order to avoid the accumulation of more and more impurities on this portion, the thickness of the impurities on the outer side wall of the boron nitride ring 3 needs to be limited to avoid affecting the transport of the glass ribbon. In use, a spacing exists between the scraper 10 and the outer side wall of the boron nitride ring 3, the scraper 10 is arranged on the left side of the boron nitride ring 3, which can also be said that be the scraper 10 is arranged on the front side of the boron nitride ring 3 in an actual device. When the impurities adhering to the outer side wall of the boron nitride ring 3 are in contact with the scraper 10 during the rotation of the boron nitride ring 3, a force to the left is applied on the scraper 10, but the scraper 10 remains stationary, so that the impurities adhering to the outer side wall of the boron nitride ring 3 are scraped off, which is convenient to use.

Figure 5A:
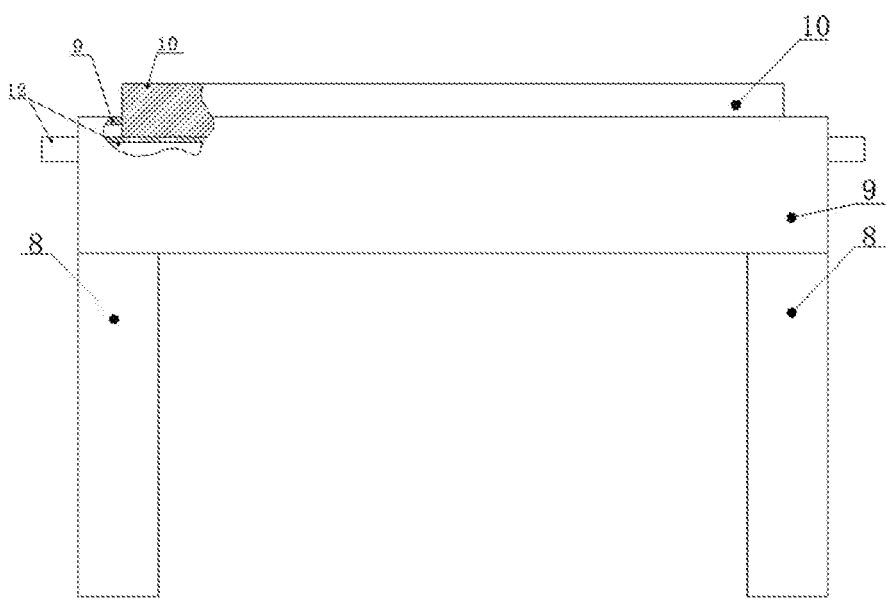
FIG. 5a is a schematic view illustrating the connection between a second support frame and a mounting base in an embodiment of the present application.

As shown in FIG. 5a, each mounting base 9 is arranged above two second support frames 8, the mounting base 9 has a hollow structure, and the scraper 10 movably passes through the mounting base 9. The scraper 10 may be a plate-like structure, and vertically mounted on the mounting base 9 in the width direction, wherein the lower end of the scraper is partially located in the mounting base 9 and the upper end thereof is protruded from the top plate of the mounting base 9, so that the scraper 10 is movable up and down through the mounting base 9.

Figure 5B:
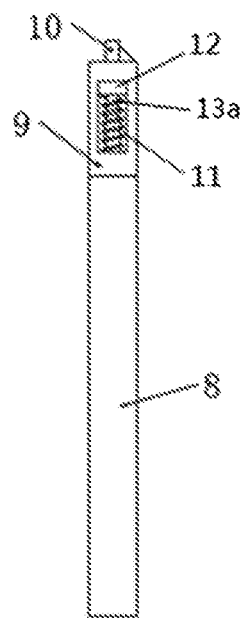
FIG. 5b is a schematic side view illustrating the connection between the second support frame and the mounting base in an embodiment of the present application.
Figure 6:
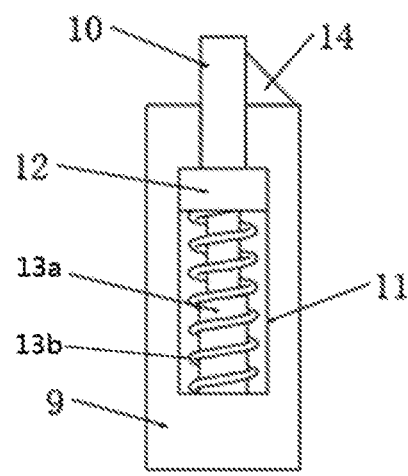
FIG. 6 is a schematic view illustrating an internal structure of a lower through-slot in an embodiment of the present application.

As shown in FIG. 5b, a lower through-slot 11, in which a down-pressing plate 12 is movably arranged, is arranged on a side wall of each mounting base 9. The scraper 10 is fixed to the upper end surface of the respective down-pressing plate 12, and movably passes through the mounting base 9. As shown in FIG. 6, the scraper 10 is fixed vertically to the upper end surface of the respective down-pressing plate 12. A plurality of telescopic rods 13a are fixed between each of the lower through-slots 11 and the down-pressing plate 12. A plurality of springs 13b are fixed between the lower through-slot 11 and the down-pressing plate 12, and are movably sleeved on the outer side walls of the telescopic rods 13a. An inclined scraping block 14 is fixed at the upper end surface of each of the mounting bases 9. In this embodiment, the scraper 10 can be fixed to the down-pressing plate 12 by welding. The lower through-slot 11 can be a rectangular tube. The scraper 10 is telescopically movable in the lower through-slot 11. The inclined scraping block 14 is mounted against the scraper 10, and an inclined surface of the inclined scraping block 14 may be arranged on a side facing the lift-up roller 2. In this embodiment, the number of the telescopic rods 13a and the springs 13b is not limited, such as one on each of both sides and one in the middle; or the number of the telescopic rods 13a and the springs 13b is the same as the number of the boron nitride rings 3 on the lift-up roller 2, and the telescopic rods 13a and the springs 13b correspond the boron nitride rings 3 in position. In this way, the down-pressing plate 12 can be movably connected to the mounting base 9 in the up and down direction by a plurality of telescopic rods 13a and a plurality of springs 13b.

Both sides of each of the down-pressing plates 12 movably pass through the annealing kiln 1. A down-pressing through-slot 15 used in cooperation with the down-pressing plate 12 is arranged on each of both sides of the annealing kiln 1. Specifically, the position of the down-pressing through-slot 15 in the annealing kiln 1 can correspond to the position of the lower through-slot 11 in two side walls of each mounting base 9. In this way, the both sides of the down-pressing plate 12 can pass through the lower through-slot 11 and move through the annealing kiln 1.

After the scraper 10 is used for a period of time, a certain amount of scraped impurities will adhere to side walls thereof. At this time, the operator can press two ends of the down-pressing plate 12, and the down-pressing plate 12 moves downward and drives the scraper 10 to move downwards together therewith. During the downward movement of the scraper 10, the impurities adhering to the side walls of the scraper 10 are scraped off with the cooperation with the inclined scraping block 14, which is convenient to use. The down-pressing plate 12 during down-pressing squeezes the spring, and the spring contracts to store elastic potential energy.

After the impurities adhering to the side walls of the scraper 10 are scraped off, the down-pressing plate 12 is released, and the down-pressing plate 12 pushes the scraper 10 back to the initial position under the action of the elastic potential energy of the spring.

Figure 7:
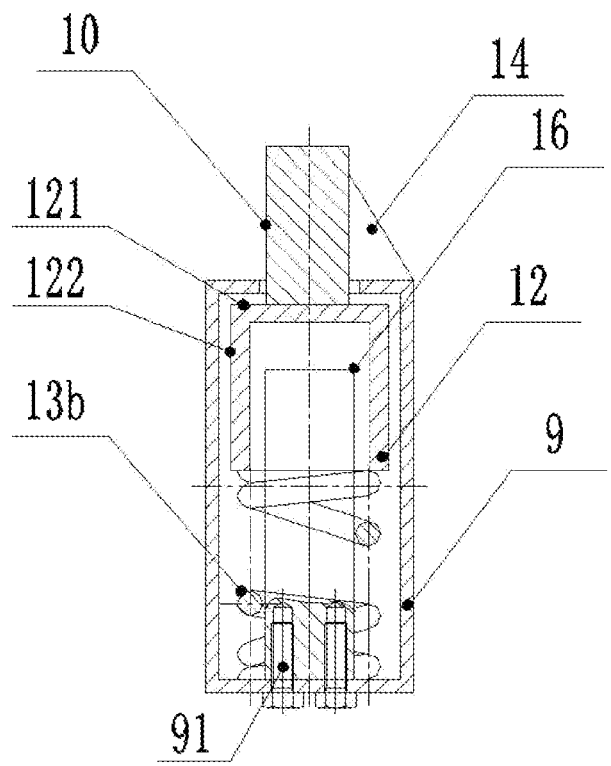
FIG. 7 is a schematic view illustrating an internal structure of the mounting base in an embodiment of the present application.
Figure 8:
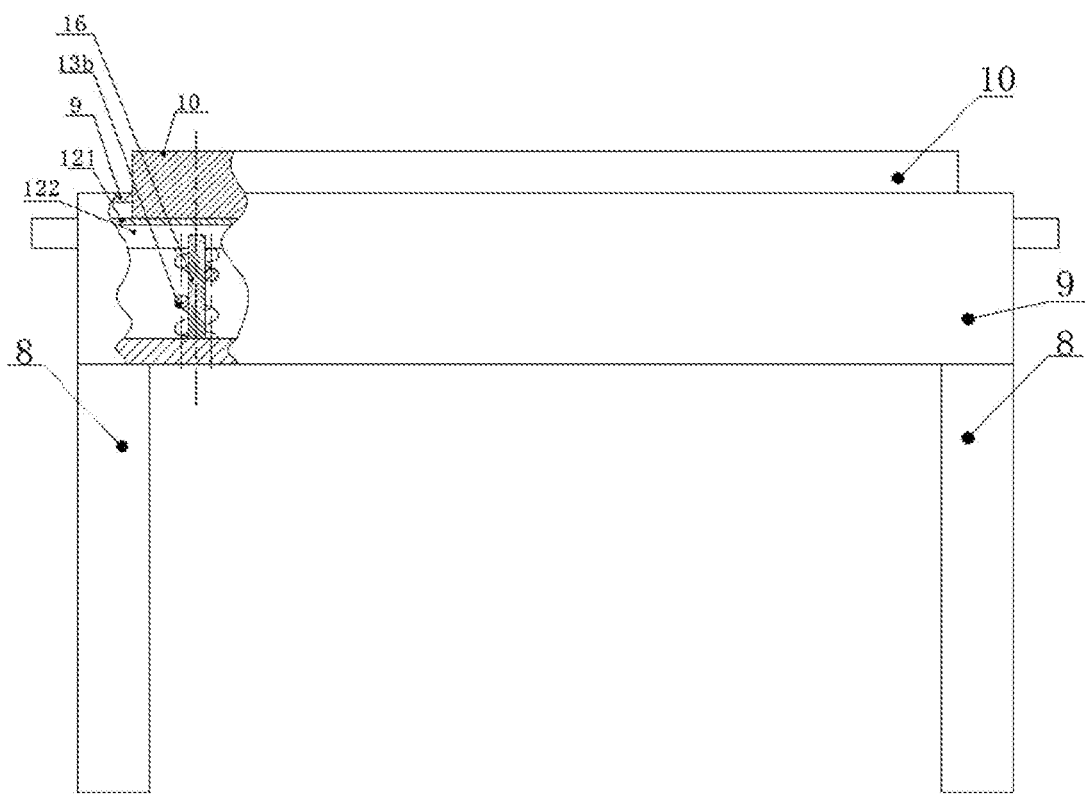
FIG. 8 is a partial section view of a cleaning assembly in an embodiment of the present application.

In another embodiment of the present application, as shown in FIGS. 7 and 8, instead of the telescopic rod, a guiding rod 16 is used in the mounting base 9 of this embodiment. As shown in FIG. 7, the spring 13b and the guiding rod 16 are mounted inside the mounting base 9, and the scraper 10 is fixedly connected to the down-pressing plate 12 and partially protrudes from the top plate of the mounting base 9. The spring 13b is sleeved outside the guiding rod 16; the down-pressing plate 12 has a down-pressing plate horizontal portion 121 and a down-pressing plate vertical portion 122, and the compression of the spring 13b is achieved by the down-pressing plate vertical portion 122. That is, the down-pressing plate 12 in this embodiment can be movably connected to the mounting base 9 in the up and down direction by a plurality of guiding rods 16 and a plurality of springs 13b. In this embodiment, the scraper 10 can be fixed to the down-pressing plate horizontal portion 121 of the down-pressing plate 12 by welding. The mounting base 9 can be a rectangular tube, and the scraper 10 is movable up and down telescopically in the mounting base 9 by the spring 13b.

Furthermore, the guiding rod 16 is fixedly connected to the bottom of the mounting base 9 by a connector 91. As shown in FIG. 7, the connector 91 can be a bolt, and the guiding rod 16 can be fixedly connected to the bottom of the mounting base 9 by two bolts.

When this embodiment is in use, after the float glass ribbon exits the tin bath outlet, light edges on both sides of the glass ribbon directly contact the outer side walls of the boron nitride rings 3. During the rotation of the respective boron nitride rings 3 by the lift-up roller 2, the glass ribbon is conveyed. During this process, the hot gas supply case delivers hot nitrogen into each heat-resisting steel tube 4, and the hot nitrogen flows upward from the exhaust holes of the respective heat-resisting steel tube 4, applying a force on the lower surface of an effective plate width of the float glass ribbon to avoid a concave on a portion of the glass ribbon of the effective plate width. When conveying the float glass ribbon in this way, the friction between the lift-up roller 2 and the lower surface of the effective plate width of the glass ribbon can be avoided, effectively solving the problem of under-plate scratches and flocculent defects of the electronic float glass ribbon. Furthermore, when using an air-floating effect of the nitrogen, the lift-up roller arrangement can be fully filled with the nitrogen to avoid an air in the lift-up roller arrangement from entering the tin bath through the tin bath outlet, reducing the generation of impurities such as tin oxide in the tin bath.

In use, a spacing exists between the scraper 10 and the outer side wall of the boron nitride ring 3, the scraper 10 is arranged on the left side of the boron nitride ring 3. When the impurities adhering to the outer side wall of the boron nitride ring 3 are in contact with the scraper 10 during the rotation of the boron nitride ring 3, a force to the left is applied on the scraper 10, but the scraper 10 remains stationary, so that the impurities adhering to the outer side wall of the boron nitride ring 3 are scraped off, which is convenient to use.

After the scraper 10 is used for a period of time, a certain amount of scraped impurities will adhere to side walls thereof. At this time, the operator can press two ends of the down-pressing plate 12, and the down-pressing plate 12 moves downward and drives the scraper 10 to move downwards together therewith. During the downward movement of the scraper 10, the impurities adhering to the side walls of the scraper 10 are scraped off with the cooperation with the inclined scraping block 14, which is convenient to use. The down-pressing plate 12 during down-pressing squeezes the spring, and the spring contracts to store elastic potential energy. After the impurities adhering to the side walls of the scraper 10 are scraped off, the down-pressing plate 12 is released, and the down-pressing plate 12 pushes the scraper 10 back to the initial position under the action of the elastic potential energy of the spring.

The embodiments described above are merely preferred embodiments of the present application, and not intended to limit the scope of the present application. Any modifications, equivalents, improvements or the like within the spirit and principle of the application should be included in the scope of the application.

What is claimed is:

1. A lift-up roller arrangement for electronic float glass, including a plurality of lift-up rollers (2) rotatablely arranged on an inner wall of an annealing kiln (1), wherein a plurality of boron nitride rings (3) are fixedly sleeved on an outer side wall of each of the lift-up rollers (2); a heat-resisting steel tube (4) is arranged on each of both sides of each of the lift-up rollers (2); a plurality of exhaust holes are arranged on an outer side wall of the heat-resisting steel tube (4); the heat-resisting steel tube (4) is in communication with an external hot gas supply case; and a plurality of cleaning assemblies used in cooperation with the lift-up rollers (2) are arranged at an inner bottom of the annealing kiln (1), wherein, multiple pairs of first support frames (5) are symmetrically fixed at the inner bottom of the annealing kiln (1); a lifting rod (6) is arranged on an upper end surface of each of the first support frames (5); two bearing rings (7) are fixedly sleeved on the outer side wall of each of the heat-resisting steel tubes (4) in a symmetrical manner; and an upper end of the lifting rod (6) is fixedly connected to an outer side wall of the bearing ring (7).

2. The lift-up roller arrangement for electronic float glass as claimed in claim 1, wherein, each of the cleaning assemblies includes two second support frames (8) symmetrically fixed at the inner bottom of the annealing kiln (1); one and the same mounting base (9) is fixed at the upper end surfaces of the two second support frames (8); and a scraper (10) is arranged in the mounting base (9).

3. The lift-up roller arrangement for electronic float glass as claimed in claim 2, wherein, a lower through-slot (11), in which a down-pressing plate (12) is movably arranged, is arranged on a side wall of each of the mounting bases (9); the scraper (10) is fixed to an upper end surface of the respective down-pressing plate (12), and movably passes through the mounting base (9).

4. The lift-up roller arrangement for electronic float glass as claimed in claim 3, wherein, the heat-resisting steel tubes (4) are arranged on left and right sides of each of the lift-up rollers (2), respectively; a spacing exists between the scraper (10) and an outer side wall of the boron nitride ring (3), and the scraper (10) is arranged on a left side of the boron nitride ring (3).

5. The lift-up roller arrangement for electronic float glass as claimed in claim 3, wherein, a plurality of telescopic rods (13) are fixed between each of the lower through-slots (11) and the down-pressing plate (12); a plurality of springs are fixed between the lower through-slot (11) and the down-pressing plate (12), and are movably sleeved on outer side walls of the telescopic rods (13).

6. The lift-up roller arrangement for electronic float glass as claimed in claim 2, wherein, an inclined scraping block (14) is fixed at the upper end surface of each of the mounting bases (9).

7. The lift-up roller arrangement for electronic float glass as claimed in claim 6, wherein, the inclined scraping block (14) is mounted against the scraper (10), and an inclined surface of the inclined scraping block (14) is arranged on a side of the inclined scraping block facing the lift-up rollers (2).

8. The lift-up roller arrangement for electronic float glass as claimed in claim 3, wherein, both sides of each of the down-pressing plates (12) movably pass through the annealing kiln (1); a down-pressing through-slot (15) used in cooperation with the down-pressing plate (12) is arranged on each of both sides of the annealing kiln (1).

* * * * *